(12) United States Patent
Kennedy (10) Patent No.: US 11,614,194 B1
(45) Date of Patent: Mar. 28, 2023

(54) PIPE CONNECTOR, GRIPPER, AND GRIPPER TEETH

(71) Applicant: Kennedy Valve Company, Elmira, NY (US)

(72) Inventor: Paul Kennedy, Horseheads, NY (US)

(73) Assignee: KENNEDY VALVE COMPANY, Elmira, NY (US)

( * ) Notice: Subject to any disclaimer, the term of this patent is extended or adjusted under 35 U.S.C. 154(b) by 0 days.

(21) Appl. No.: 17/504,253

(22) Filed: Oct. 18, 2021

(51) Int. Cl.
*F16L 37/091* (2006.01)
*F16L 47/04* (2006.01)

(52) U.S. Cl.
CPC .............. *F16L 47/04* (2013.01); *F16L 37/091* (2013.01)

(58) Field of Classification Search
CPC ......... F16L 19/08; F16L 19/083; F16L 15/06; F16L 37/091; F16L 37/0925; F16L 47/04
USPC .................. 285/40, 104, 314, 315, 316, 317
See application file for complete search history.

(56) References Cited

U.S. PATENT DOCUMENTS

| | | | |
|---|---|---|---|
| 5,335,946 A * | 8/1994 | Dent ........................ | F16L 47/12 285/332 |
| 6,416,085 B1 * | 7/2002 | Markovic ............. | F16L 33/225 285/104 |
| 10,774,508 B2 * | 9/2020 | Furcoiu ..................... | E03B 9/04 |

* cited by examiner

*Primary Examiner* — Aaron M Dunwoody
(74) *Attorney, Agent, or Firm* — Brown & Michaels, PC (57) ABSTRACT

A gripper for a pipe connector includes a body, a first tooth, and a second tooth. The body has a first side, a second side adjacent the first side, a third side adjacent the first side and opposite the second side, and a fourth side adjacent the second side and the third side and opposite the first side. The first tooth extends from the fourth side of the body at a first distance from the first side of the body perpendicular to the first side of the body. The second tooth extends from the fourth side of the body at a second distance from the first side of the body perpendicular to the first side of the body. The second distance is less than the first distance.

26 Claims, 7 Drawing Sheets

PIPE CONNECTOR, GRIPPER, AND GRIPPER TEETH

BACKGROUND OF THE INVENTION

Field of the Invention

The invention pertains to the field of pipe connectors, and more particularly, to a pipe connector gripper and gripper teeth.

Description of Related Art

Some types of pipe connectors, or couplings, require insertion of a pipe into a receiving end. To avoid the pipe decoupling from the pipe connector, a retention mechanism physically holds the pipe end in the receiving end. Some of these pipe connectors have a clamping ring that can be tightened or compressed radially inward around the pipe. Some of these clamping rings have teeth extending from a radially inwardly facing surface toward the inserted pipe. These teeth are uniformly sized and shaped, and are uniformly spaced in a single annular row around the clamping ring, such that when the clamping ring tightens around a circumference of the pipe, radially inward compressive force is focused at evenly spaced locations around the circumference of the pipe where each tooth contacts the pipe.

SUMMARY OF THE INVENTION

In accordance with an embodiment, a gripper for a pipe connector includes a body, a first tooth, and a second tooth. The body has a first side, a second side adjacent the first side, a third side adjacent the first side and opposite the second side, and a fourth side adjacent the second side and the third side and opposite the first side. The first tooth extends from the fourth side of the body at a first distance from the first side of the body perpendicular to the first side of the body. The second tooth extends from the fourth side of the body at a second distance from the first side of the body perpendicular to the first side of the body. The second distance is less than the first distance.

In accordance with another embodiment, a gripper for a pipe connector includes a semi-annular body, a first tooth, and a second tooth. The semi-annular body has a center axis, a first side facing radially outward, and a second side facing radially inward. The first tooth has a first peak at a first radial distance from the center axis, and the first tooth extends from the second side of the body to the first peak. The second tooth has a second peak at a second radial distance from the center axis, and the second tooth extends from the second side of the body to the second peak. The second radial distance is greater than the first radial distance.

In accordance with another embodiment, a gripper for a pipe connector includes a body and a plurality of teeth. The body has a first side, a second side adjacent the first side, a third side adjacent the first side and opposite the second side, and a fourth side adjacent the second side and the third side and opposite the first side. The plurality of teeth extend from the fourth side of the body. Each tooth has a peak, a second-side-facing surface extending from the fourth side to the peak, and a third-side-facing surface extending from the fourth side to the peak. An angle between the second-side-facing surface and the third side is approximately 145 degrees, and an angle between the third-side-facing surface and the third side is approximately 7.5 degrees.

In accordance with another embodiment, a gripper for a pipe connector includes a semi-annular body and a first tooth. The semi-annular body has a center axis, a first side facing radially outward, a second side adjacent the first side, a third side adjacent the first side and opposite the second side, and a fourth side facing radially inward. The fourth side is adjacent the second side and the third side. The first tooth has a peak semi-annular about the center axis, a second-side-facing surface extending from the fourth side to the peak, and a third-side-facing surface extending from the fourth side to the peak. An angle between the second-side-facing surface and the center axis is approximately 55 degrees, and an angle between the third-side-facing surface and the center axis is approximately 97.5 degrees.

DETAILED DESCRIPTION OF THE INVENTION

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "approximately" and "about", when qualifying a quantity, shall mean the quantity with a tolerance plus or minus 10 percent of the quantity, unless otherwise specified.

Figure 1:
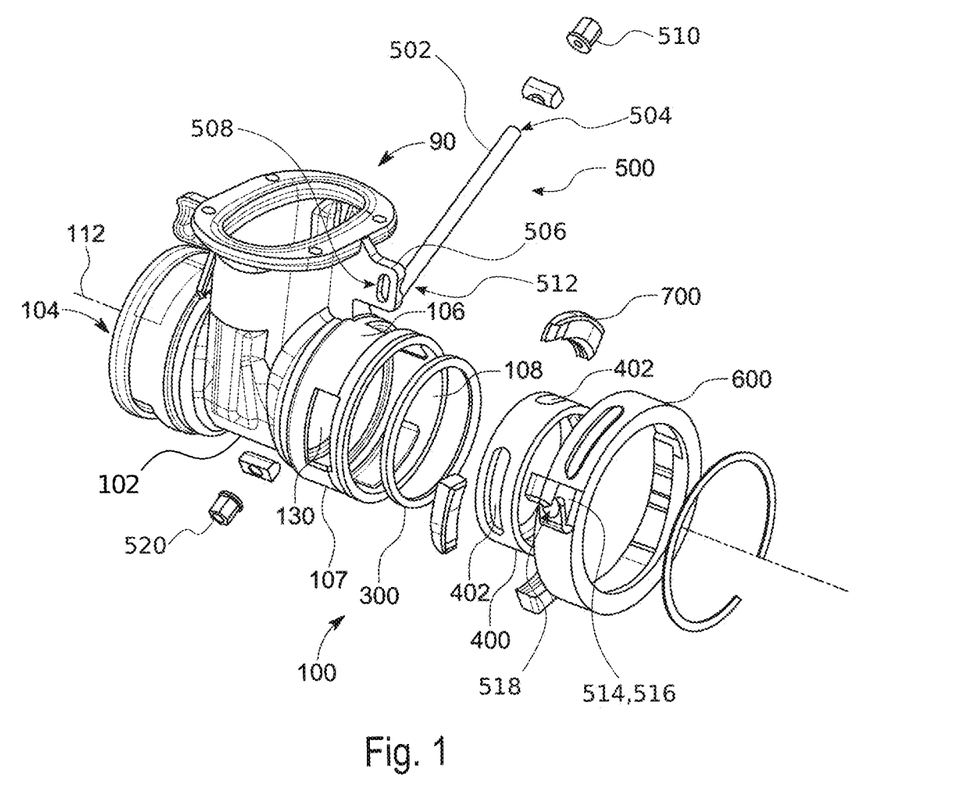
FIG. 1 shows an exploded view of a valve including a pipe connector, according to an embodiment of the invention.
Figure 2:
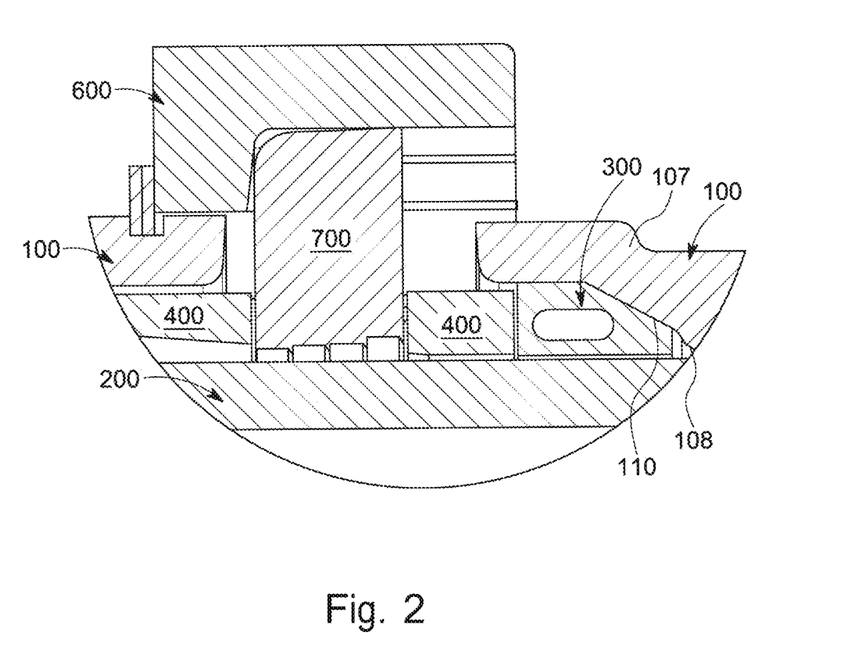
FIG. 2 shows a cross-sectional partial view of the pipe connector of FIG. 1.

FIG. 1 shows an exploded view of a valve 90 including a pipe connector 100 and a pipe 200, according to an embodiment of the invention. The pipe connector 100, while shown integrated as part of the valve 90, can be implemented as part of a variety of valves, adapters, couplings, or other piping or plumbing fittings and applications. Accordingly, the operational components of the valve 90, which are not relevant to the pipe connector 100, are omitted from the drawings and the following description. FIG. 2 shows a cross-sectional partial view of the pipe connector of FIG. 1, with the pipe 200 inside the pipe connector 100 ready to be gripped, according to an embodiment.

Referring to FIG. 1 and FIG. 2, the pipe connector 100 includes a body 102 with a flow passage 104 therethrough. An outer surface 106 of a pipe-receiving portion 107 faces radially outward, and an inner surface 108 of the pipe-receiving portion 107 faces radially inward. A groove 110 can be provided around, and/or cut into, the inner surface 108 of the pipe-receiving portion 107 to receive a seal element 300 configured to seal between the pipe 200 and the inner surface 108 of the pipe-receiving portion 107. A compression element 400 can be moved against the seal element 300 to compress the seal element 300 between the compression element 400 and a side of the groove 110. The compression element 400 can be inserted into the pipe-receiving portion 107, and after the pipe 200 is also positioned in the pipe-receiving portion 107 through the compression element 400, a force can be applied to press the compression element 400 against the seal element 300 and compress the seal element 300 in a direction parallel with a center axis 112 of the flow passage 104. Compression results in an expansion of the seal element 300 in the radially inward direction toward the center axis 112 of the flow passage 104, decreasing the diameter of the seal element 300 to contact and deform against the pipe 200. The seal element 300 is compressed between the pipe 200 and the inner surface 108 to prevent passage of fluid between the inner surface 108 and the pipe 200.

An actuating element 500 interacts with a cam ring 600 and grippers 700 to supply the force applied to move the compression element 400 against the seal element 300. The grippers 700 extend through first apertures 130 radially arranged around the pipe-receiving portion 107, extended from the outer surface 106 through the inner surface 108. The first apertures 130 are sized such that when grippers 700 are inserted, the grippers 700 can move axially toward and away from the seal element 300 but are constrained against movement circumferentially. The drawings show three first apertures 130, but it will be understood that the provision of other numbers of first apertures 130 is within the scope of the disclosure.

The compression element 400 includes second apertures that are configured to align with the first apertures, such that the grippers 700 can also extend through the second apertures. The second apertures 402 are sized, however, smaller than the first apertures 130, such that axial movement of the grippers 700 will move the compression element 400 axially.

Figure 3:
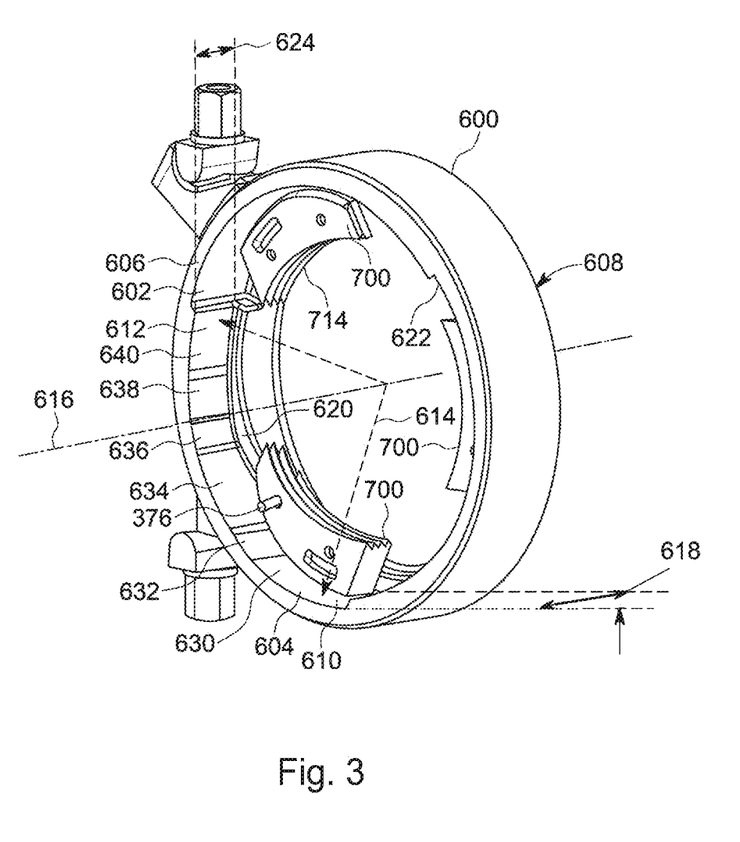
FIG. 3 shows a perspective view of grippers and a compression element, according to an embodiment of the invention.

Axial movement of the grippers 700 results from rotation of the cam ring 600. FIG. 3 shows a perspective view of the grippers 700 and the cam ring 600. A radially inward-facing side 602 of the cam ring 600 is provided with a plurality of cam elements 604 between a first axial side 606 and a second axial side 608 of the cam ring 600. The number of cam elements 604 matches the number of first apertures 130, the number of second apertures 402, and the number of grippers 700. Each cam element 604 extends a circumferential length along a portion of the radially inward-facing side 602 from a first end 610 to a second end 612. At the first end 610, the radially inward facing side 602 at each cam element 604 has a first radial depth 614 from a center axis 616 of the cam ring 600. Also at the first end 610, each cam element 604 has a first axial depth 618 from the first axial side 606 of the cam ring 600 defined by a wall 620. At the second end 612, the radially inward facing side 602 at each cam element 604 has a second radial depth 622 from a center axis 616 of the cam ring 600. Also at the second end 612, each cam element 604 has a second axial depth 624 from the first axial side 606 of the cam ring 600 defined by the wall 620. The second radial depth 622 is less than the first radial depth 614, such that as each gripper 700 moves relative to the cam ring 600 along a respective cam element 604 from the first end 610 to the second end 612, each gripper 700 is forced radially inward toward the pipe 200. The second axial depth 624 from the first axial side 606 of the cam ring 600 to the wall 620 is also less than the first axial depth, such that as each gripper 700 moves along a respective cam element 604 from the first end 610 to the second end 612, each gripper 700 is forced axially toward the first axial side 606 and the seal element 300. The gripper 700 is moved relative to the cam ring 600 along the radially inward facing side 602 of the cam ring 600 by rotating the cam element 600.

Between the first end 610 and the second end 612, the slope or taper of the radially inward facing side 602 and the wall 620 can vary, delineating separate portions of each cam element 604. The presently depicted cam ring 600 includes a first cam section 630 with a first radial depth at the first end 610. The gripper 700 is at this first cam section 630 before the pipe 200 is inserted and gripped by the pipe connector 100. A second cam section 632 adjacent the first cam section 630 has a first slope radially inward from the first cam section 630 at a relatively steep angle (relative to the slope of some of the other cam sections) in order to push the gripper 700 toward to the pipe 200 with short or minimal rotation of the cam ring 600. A third cam section 634 adjacent the second cam section 632 shifts axially from the second cam section 632, such that as the cam ring 600 rotates and the gripper 700 moves through the third cam section 634, the gripper 700 is pushed axially to move the compression element 400 axially against the seal element 300. A fourth cam section 636 adjacent the third cam section 634 has a second slope radially inward from the third cam section 634 at a shallow angle relative to the slope of other cam sections, such as the second cam section 632. The slope of the fourth cam section 636, when the cam ring 600 is rotated, begins wedging the gripper 700 into the pipe 200. A fifth cam section 638 adjacent the fourth cam section 636 has a third slope radially inward from the fourth cam section 636 also at a relatively shallow angle relative to the slope angle of the second cam section 632. This slope of the fifth cam section 638 is configured to continue wedging the gripper 700 against the pipe 200 when the pipe 200 is ductile iron or other similar hardness, compressing the gripper 700 against the ductile pipe to create a frictional force strong enough to hold the ductile pipe. A sixth cam section 640 adjacent the fifth cam section 638 includes a fourth slope radially inward from the fifth cam section 638 at a steep angle relative to the slope angle of the fifth cam section 638. This fourth slope is configured to wedge a plurality of the teeth 714 of the gripper 700 into PVC pipe, or other pipe of similar hardness.

The actuating element 500 can be actuated to rotate the cam ring 600. In the embodiment of FIGS. 1-3, a bolt 502, at a first end 504, can be attached to a first attachment element 506 on the body 102 of the pipe connector 100. The first attachment element 506 can be a first bracket with a first bolt hole 508, and the bolt 502 can be inserted through the first bolt hole 508 and threaded through a first nut 510. The bolt 502, at a second end 512, can be attached to a second attachment element 514 on the cam ring 600. The second attachment element 514 can be a second bracket 516 with a second bolt hole 518, and the bolt 502 can be inserted through the second bolt hole 518 and threaded through a second nut 520. Screwing the first nut 510 or the second nut 520 pulls first attachment element 506 toward the second attachment element 514, which rotates the cam ring 600, which in turn moves the grippers 700 axially, which in turn moves the compression element 400 into the seal element 300 and moves the grippers 700 radially inward.

Figure 4:
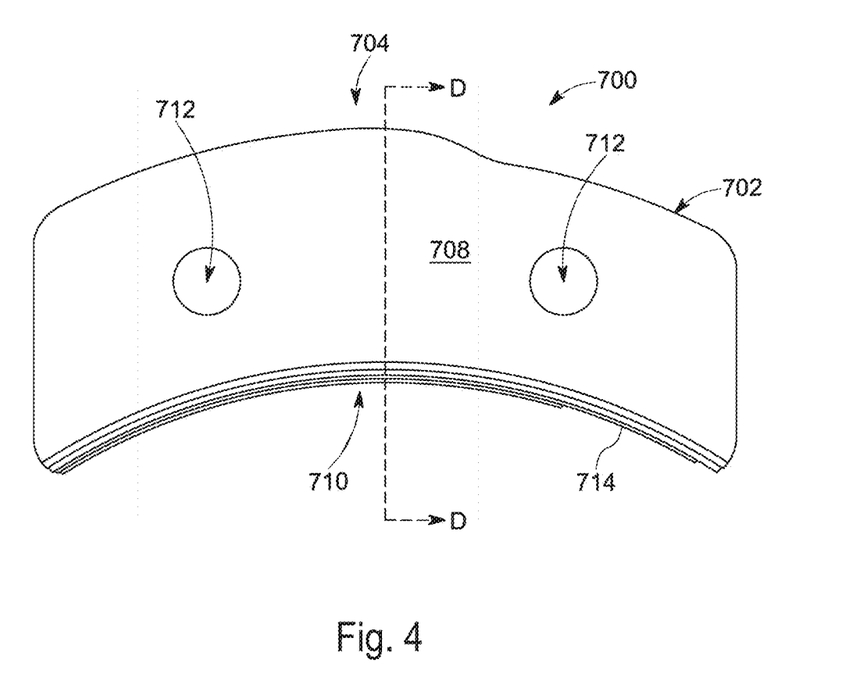
FIG. 4 shows a front view of one of the grippers shown in FIG. 1.

FIG. 4 shows a front view of one of the grippers 700. The gripper 700 can have a body 702 with a first side 704, a second side 706 adjacent the first side 704, a third side 708 adjacent the first side 704 and opposite the second side 706, and a fourth side 710 adjacent the second side 706 and the third side 708 and opposite the first side 704. One or more holes 712 can extend into or through the body 702 from the second side 706 and/or the third side 708. The depicted body 702 is semi-annular about a center axis (shown as center axis 616 in FIG. 3), such that the first side 704 faces radially outward and the fourth side 710 faces radially inward. Alternatively, it is conceived that the gripper 700 could extend linearly in the direction the gripper 700 is depicted extending annularly, in order to act on a flat-sided object rather than a cylindrical object.

Referring to FIGS. 1-4, when the grippers 700 are at the first end 610 of the cam element 604, before the pipe 200 is inserted in and gripped by the pipe connector 100, the grippers 700 can be held at a minimum radially outward position so that the pipe can be inserted without interference from the grippers 700. This minimum radially outward position corresponds with a position of the retention holes 712 in the gripper 700. Retention elements 376 made of plastic or other suitably soft or breakable but rigid material can be positioned in and extending from the retention holes 712, such that if the grippers 700 move radially inward with light force (e.g., the force of gravity or less), the retention elements 376 hit the compression element 400, which prevents further radially inward movement of the grippers 700 and prevents the grippers 700 from obstructing a path for the pipe 200 to be inserted within the pipe connector 300. After the pipe 200 is inserted into the pipe connector 300, when the cam ring 600 is rotated to move the grippers 700 radially inward, the applied force causes the retention elements 376 to rip or sheer off against the compression element 400, allowing the grippers 700 to continue moving radially inward to grip the pipe 200.

As the grippers 700 move radially inward, the grippers 700 press into the pipe 200 to clamp and grip the pipe 200 inside the pipe-receiving portion 107 of the pipe connector 100. Facilitating this gripping function, the grippers 700 have teeth 714. The teeth 714 extend from the fourth side 710.

Figure 5:
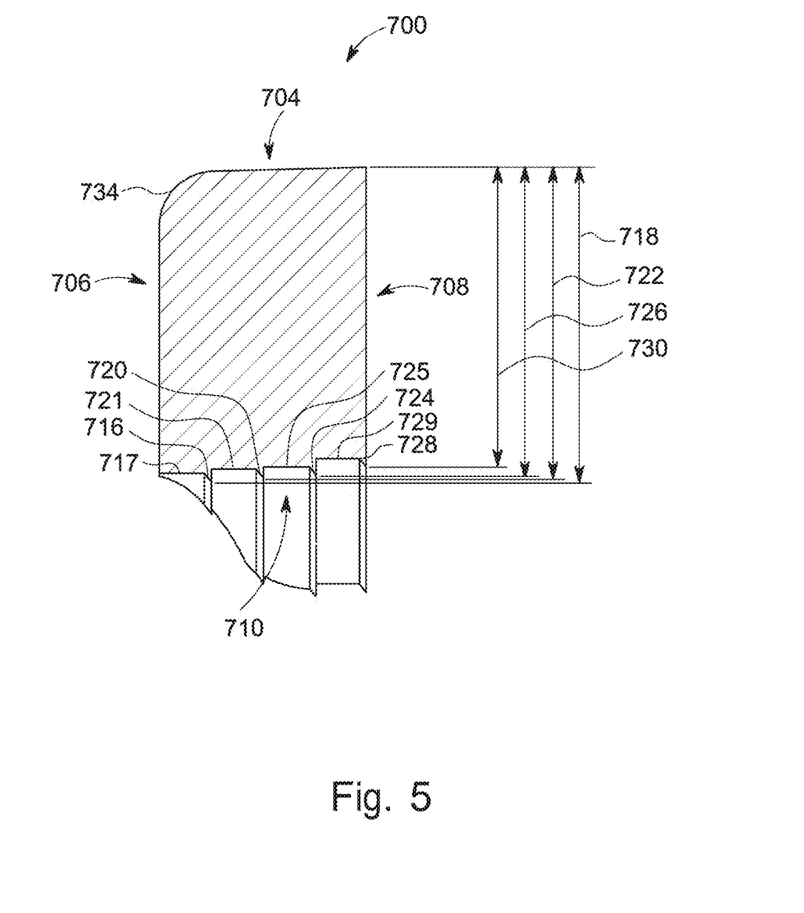
FIG. 5 shows a cross-section of the gripper of FIG. 4 along D:D.
Figure 6:
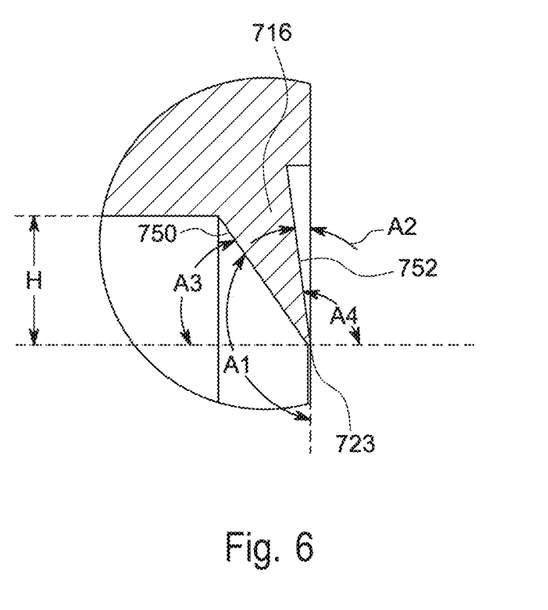
FIG. 6 shows enlarged Detail A of FIG. 5.

FIG. 5 shows a partial, cross-sectional view of one of the grippers 700 along line D-D of FIG. 4. FIG. 6 is an enlarged view of a portion of FIG. 5 showing a first tooth 716 adjacent the second side 706 of the body 702. Referring to FIGS. 4-6, the fourth side 710 of the body 702 is stepped. The first tooth 716 has a second-side-facing surface 750 that extends from a first step 717 to a point at a first distance 718 from the first side 704 of the body 702. The second-side-facing surface faces generally toward the second side 706 of the gripper 700, though not necessarily at a perpendicular angle. The first tooth 716 also has a third-side-facing surface 752 that extends from a second step 721 at a second distance 722 from the first side 704 of the body 702. The third-side-facing surface 752 generally faces toward the third side 708 of the gripper 700, though not necessarily at a perpendicular angle. In the illustrated embodiment, an angle A1 between the second-side-facing surface 750 and a plane perpendicular to the center axis 616, or a plane of the third side 708, is approximately 145 degrees, and an angle A2 between the third-side-facing surface 752 and a plane perpendicular to the center axis 616, or a plane of the third side 708, is approximately 7.5 degrees. In other words, an angle A3 between the second-side-facing surface 750 and the center axis 616 is approximately 55 degrees, and an angle A4 between the third-side-facing surface 752 and the center axis 616 is approximately 97.5 degrees. The second-side-facing surface 750 is angled less steeply than the third-side-facing surface 752 to provide a wider base of the first tooth 716 and to facilitate structural support for the first tooth 716, while being steep enough to facilitate the ability to pierce a plastic pipe. The third-side-facing surface 752 is steeper in order to facilitate the ability to pierce plastic pipe, and/or to facilitate digging into the surface of plastic or harder pipe (e.g. ductile iron). The direction and value of angle A2 facilitates the first tooth 716 digging into the pipe if a force is applied to pull the pipe in a direction to disengage with the gripper 700. The angles A1, A2, A3 can vary as desired, depending on the specific height of the tooth desired, the tooth sharpness desired, the hardness of the pipe, etc.

A second tooth 720 extends from a second step 721 at a second distance 722 from the first side 704 of the body 702. The second tooth 720 is spaced from the first tooth 716 toward the third side 708 of the body 702. The size, the shape, and/or a height H of each tooth 716, 720 from a respective step of the fourth side 710 to a peak 723 can be the same or varied to achieve the desired tooth sharpness, the desired tooth strength, and/or the desired respective first distance 718 or second distance 722 from the first side 704 of the body 702. In each case, however, the second distance 722 is less than the first distance 718, such that the peak 723 of the first tooth 716 is radially outward of the peak 723 of the second tooth 720. When the gripper 700 moves radially inward into contact with the pipe 200, the first tooth 716 strikes the pipe 200 before the second tooth 720, thereby either deforming against the pipe 200 more than the second tooth 720 or pressing into the pipe 200 more than the second tooth 720. "Pressing into" can mean depressing a portion of the pipe 200 or piercing the surface of the pipe 200. The peaks 723 can be approximately congruent with a shape of pipe 200 or another gripped object. For example, in the depicted embodiment, the pipe 200 is cylindrical, so the peaks 723 are arc-shaped or semi-annular.

The variation in radial position of the respective peaks 723 can be achieved, alternatively, by having the fourth side 704 be non-stepped with a uniform radial position, and by having the first tooth 716 and the second tooth 720 be differently sized with different heights H. The depicted embodiment can be manufactured with less tooling equipment and cost. Further, the uniform, relatively small height H of each tooth 714 in the depicted embodiment results in a uniform maximum puncture into a surface of the pipe 200. Further, the steps provide recesses to avoid interference with the pipe as the gripper rotates and each successive tooth engages the pipe.

The variation in radial position of the respective peaks 723 of the teeth 714 of the gripper 700 facilitate tilting the more radially outward teeth (e.g., the second tooth 720 is more radially outward than the first tooth 716) radially inward, or toward the pipe 200. As each tooth 714 successively contacts the pipe 200, in conjunction with friction between the respective one of teeth 714 and the pipe 200, axial movement of the gripper 700 results in a force acting to pivot or tilt the teeth 714 not yet in contact with the pipe 200 toward the pipe 200.

The variation in radial position of the peak 723 of each tooth 716, 720 can also facilitate a variation and range in gripping force and/or performance. The variation in radial position of each peak 723 can correspond with variation in movement of the gripper 700 caused by variations between differently sloped portions of each cam element 604. Further, keeping in mind that any number of teeth 714 can be included within practical limitations of size and how many teeth 714 can fit on the gripper 700, the number of the differently sloping portions of the cam ring 600 can drive the number of teeth 714. For example, the number of teeth 714 can correspond with the number of radially sloping cam sections, such that during actuation of the cam ring 600, each radially sloping cam section presses another tooth against the pipe 200. In the depicted embodiment, the gripper 700 additionally includes a third tooth 724 with a second-side-facing surface 750 extending from a third step 725 to a point at a third distance 726 from the first side 704 of the body 702, and a fourth tooth 728 with a second-side-facing surface 750 extending from a fourth step 729 to a point at a fourth distance 730 from the first side 704 of the body 702. The third tooth 724 is spaced from the second tooth 720 toward the third side 708 of the body 702, and the fourth tooth 728 is spaced from the third tooth 724 toward the third side 708 of the body 702. The third tooth 724 and the fourth tooth 728 also can have the height H, or another height, from a respective step of the fourth side 704 of the body 702, such that the third distance 726 is less than the second distance 722, and the fourth distance 730 is less than the third distance 726. As with the first tooth 716 and the second tooth 720, this variation in radial position of the respective peaks 723 of the third tooth 724 and the fourth tooth 728 can be created, alternatively, by having the fourth side 704 be non-stepped with a uniform radial position, and by having the teeth 714 be different sizes with different heights.

During movement to grip a pipe, as each tooth 714 successively contacts the pipe 200, in conjunction with friction between the respective one of teeth 714 and the pipe 200, axial movement of the gripper 700 results in a force acting to pivot or tilt the teeth 714 successively, from the first tooth 716 to the fourth tooth 728, into contact with the pipe 200.

To facilitate rotation of the gripper 700 and the teeth successively moving toward the pipe 200, the first surface 704 can be sloped radially inward (e.g., at approximately 2 degrees) from the third surface 708 to the second surface 706. As a result, when the cam ring 600 presses upon the first surface 704, the cam ring 600 can exert a force to tilt the more radially outward teeth 714 radially inward, or toward the pipe 200. A corner 734 between the second side 706 and the first side 704 can be rounded to create space at the corner 734 for the gripper 700 to rotate. The wall 620 of the cam ring 600 can also be sloped away from perpendicular to axis 616 to facilitate tilting of the fourth tooth 728 radially inward or toward the pipe 200.

Figure 7:
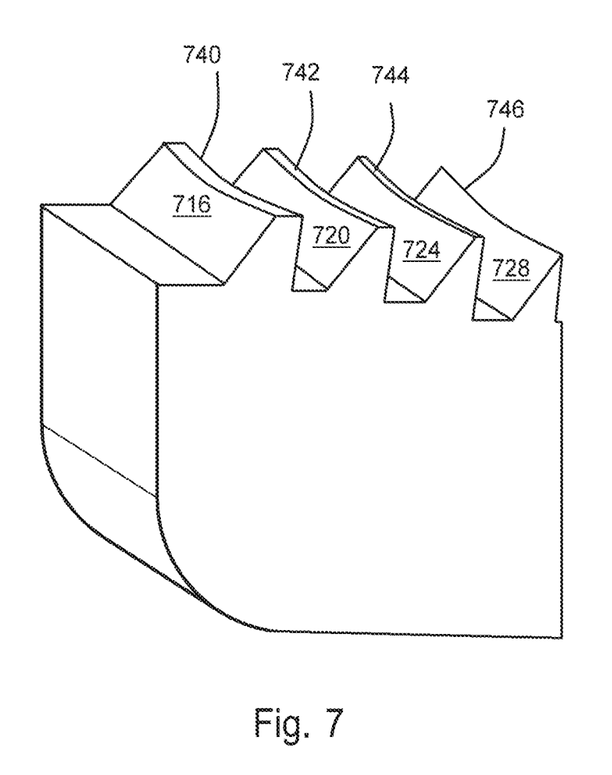
FIG. 7 shows a partial view of peaks of the gripper teeth, according to an embodiment.

FIG. 7 shows a partial view of peaks of the teeth 716, 720, 724, 728, according to an embodiment of the gripper 700. In some embodiments, the sharpness of each tooth is approximately equal. In other embodiments, the sharpness of each tooth can be configured as desired. In the particular embodiment shown in FIG. 7, the teeth 716, 720, 724, 728 have increasing sharpness moving from the first tooth 716 to the fourth tooth 728. A first peak 740 of the first tooth 716 has a first degree of sharpness that is the dullest of all the teeth 714. The relatively dull first peak has a flatness that facilitates properly orienting the gripper 700 when the gripper 700 begins wedging against the pipe 200. A flat surface 741 between and connecting the second-side-facing surface 706 and the third-side-facing surface 708 can account for the flatness. A second peak 742 of the second tooth 720 is sharper than the peak 740 of the first tooth 716, with a flatness lesser (shorter) than the flatness of the first peak 740. A third peak 744 of the third tooth 724 is sharper than the second peak 742 of the second tooth 720, with a flatness lesser (shorter) than the flatness of the second peak 742, though the third peak 744 could also be the same sharpness with the same flatness as the second peak 742. A fourth peak 746 of the fourth tooth 728 has a sharpness greater than the third peak 744 of the third tooth 724, with a flatness (e.g., 0.001 inches (approximately 0.025 millimeters)) or lesser (shorter) than the flatness of the third peak 744. The increasing sharpness from each successive tooth facilitates reorientation of the gripper 700 on an increasingly fine scale, to properly orient the gripper 700 as the gripper teeth 714 gradually and increasingly bite against and/or into the pipe 200. When the pipe 200 is hard like ductile iron pipe, the teeth 714 flatten against the pipe 200 with increasing force, and when the pipe 200 is softer, as with PVC pipe, the sharper teeth 714 cut into the surface of the pipe 200.

The height H of each tooth can also vary in relation to the sharpness. A sharper tooth can be designed with greater height H to account for greater compression and shortening of the tooth height H during use, while the same tooth made less sharp can be configured with a lesser height H to account for less compression and shortening of the tooth height H during use.

The pipe connector 100 described herein is provided as an example of use and operation of the gripper 700. The disclosure of pipe connector 100 is not intended to limit the gripper 700. The gripper 700 can be used in a great variety of applications, with radially inward force applied by a variety of structural apparatus and mechanisms, to grip a pipe or other structure.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A gripper for a pipe connector, comprising:
a body having a first side, a second side adjacent the first side, a third side adjacent the first side and opposite the second side, and a fourth side adjacent the second side and the third side and opposite the first side;
a first tooth extending from the fourth side of the body at a first distance from the first side of the body perpendicular to the first side of the body; and
a second tooth extending from the fourth side of the body at a second distance from the first side of the body perpendicular to the first side of the body, the second distance less than the first distance;
wherein the first tooth comprises:
a peak;
a second-side-facing surface extending from the fourth side to the peak; and
a third-side-facing surface extending from the fourth side to the peak,
the peak including a flat surface between and connecting the second-side-facing surface and the third-side-facing surface.

2. The gripper of claim 1, wherein the second tooth is spaced from the first tooth toward the third side of the body.

3. The gripper of claim 1, wherein the first tooth has a peak extending in an arc shape to grip an arc shaped surface.

4. The gripper of claim 1, wherein the first tooth has a peak extending annularly to grip an annular surface.

5. The gripper of claim 1, further comprising:
a third tooth extending from the fourth side of the body at a third distance from the first side of the body perpendicular to the first side of the body, the third distance less than the second distance.

6. The gripper of claim 5, wherein the second tooth is spaced from the first tooth toward the third side of the body, and the third tooth is spaced from the second tooth toward the third side of the body.

7. The gripper of claim 5, further comprising:
a fourth tooth extending from the fourth side of the body at a fourth distance from the first side of the body perpendicular to the first side of the body, the fourth distance less than the third distance.

8. The gripper of claim 7, wherein the second tooth is spaced from the first tooth toward the third side of the body, the third tooth is spaced from the second tooth toward the third side of the body, and the fourth tooth is spaced from the third tooth toward the third side of the body.

9. The gripper of claim 8, wherein:
the first tooth has a first degree of sharpness,
the second tooth has a second degree of sharpness greater than the first degree of sharpness,
the third tooth has a third degree of sharpness greater than the second degree of sharpness, and
the fourth tooth has a fourth degree of sharpness greater than the third degree of sharpness.

10. The gripper of claim 1, wherein the first tooth comprises:
a peak;
a second-side-facing surface extending from the fourth side to the peak; and
a third-side-facing surface extending from the fourth side to the peak,
an angle between the second-side-facing surface and the third side being approximately 145 degrees,
an angle between the third-side-facing surface and the third side being approximately 7.5 degrees.

11. The gripper of claim 1, wherein the first tooth comprises:
a peak;
a second-side-facing surface extending from the fourth side to the peak;
a third-side-facing surface extending from the fourth side to the peak; and
a center axis about which the peak is annular,
an angle between the second-side-facing surface and the center axis being approximately 55 degrees,
an angle between the third-side-facing surface and the center axis being approximately 97.5 degrees.

12. The gripper of claim 1, wherein the flat surface extends approximately 0.001 inches between the second-side-facing surface and the third-side-facing surface.

13. The gripper of claim 1, wherein a hole extends from the second side of the body to the third side of the body.

14. The gripper of claim 13, further comprising a retention tab positioned in and extending from the hole, the retention tab configured to break off under a force greater than the force of gravity on the gripper.

15. The gripper of claim 1, wherein the fourth side includes a first step from which the first tooth extends and a second step from which the second tooth extends.

16. The gripper of claim 1, wherein the first tooth comprises a second-side-facing surface facing the second side of the gripper, and a third-side-facing surface facing the third side of the gripper, and wherein the fourth side of the gripper includes a first step and a second step, the first step radially inward relative to the second step, the second-side-facing surface extending from the first step, the third-side-facing surface extending from the second step.

17. A gripper for a pipe connector, comprising:
a semi-annular body having a center axis, a first side facing radially outward, and a second side facing radially inward;
a first tooth having a first peak, the first tooth extending from the second side of the body to the first peak, the first peak being at a first radial distance from the center axis; and
a second tooth having a second peak, the second tooth extending from the second side of the body, the second peak being at a second radial distance from the center axis, the second radial distance being greater than the first radial distance;
wherein the second side includes a first step from which the first tooth extends and a second step from which the second tooth extends, the first step being located radially inward from the second step.

18. The gripper of claim 17, wherein the first tooth and the second tooth have the same size and shape.

19. A gripper for a pipe connector, comprising:
a body having a first side, a second side adjacent the first side, a third side adjacent the first side and opposite the second side, and a fourth side adjacent the second side and the third side and opposite the first side; and
a plurality of teeth extending from the fourth side of the body, each tooth having a peak, a second-side-facing surface extending from the fourth side to the peak, and a third-side-facing surface extending from the fourth side to the peak, an angle between the second-side-facing surface and the third side being approximately 145 degrees, an angle between the third-side-facing surface and the third side being approximately 7.5 degrees.

20. The gripper of claim 19, wherein the plurality of teeth comprises:
    a first tooth with a first degree of sharpness;
    a second tooth with a second degree of sharpness, the second degree of sharpness greater than the first degree of sharpness;
    a third tooth with a third degree of sharpness, the second tooth between the first tooth and the third tooth, and the third degree of sharpness greater than the second degree of sharpness; and
    a fourth tooth with a fourth degree of sharpness, the second tooth and the third tooth between the first tooth and the fourth tooth, and the fourth degree of sharpness greater than the third degree of sharpness.

21. The gripper of claim 19, wherein the plurality of teeth further comprises:
    a first tooth extending from the fourth side of the body at a first distance from the first side of the body; and
    a second tooth extending from the fourth side of the body at a second distance from the first side of the body perpendicular to the first side of the body, the second distance less than the first distance.

22. The gripper of claim 21, wherein the plurality of teeth further comprises:
    a third tooth extending from the fourth side of the body at a third distance from the first side of the body, the second tooth between the first tooth and the third tooth, and the third distance less than the second distance.

23. The gripper of claim 22, wherein the plurality of teeth further comprises:
    a fourth tooth extending from the fourth side of the body at a fourth distance from the first side of the body, the second tooth and the third tooth between the first tooth and the fourth tooth, and the fourth distance less than the third distance.

24. The gripper of claim 19, wherein a hole extends from the second side of the body to the third side of the body.

25. The gripper of claim 24, further comprising a retention tab positioned in and extending from the hole, the retention tab configured to break off under a force greater than the force of gravity on the gripper.

26. A gripper for a pipe connector, comprising:
    a semi-annular body having a center axis, a first side facing radially outward, a second side adjacent the first side, a third side adjacent the first side and opposite the second side, and a fourth side facing radially inward, the fourth side being adjacent the second side and the third side; and
    a first tooth extending from the fourth side of the body, the first tooth having a peak, a second-side-facing surface extending from the fourth side to the peak, a third-side-facing surface extending from the fourth side to the peak, the peak being semi-annular about the center axis,
    an angle between the second-side-facing surface and the center axis being approximately 55 degrees,
    an angle between the third-side-facing surface and the center axis being approximately 97.5 degrees.

* * * * *